United States Patent
Witzke

[15] 3,648,377
[45] Mar. 14, 1972

[54] SLING ROUNDNESS GAGE
[72] Inventor: Frederick W. Witzke, Ann Arbor, Mich.
[73] Assignee: The Bendix Corporation
[22] Filed: June 25, 1969
[21] Appl. No.: 836,368

[52] U.S. Cl. ..........................33/174 R, 33/178 D, 33/178 E, 33/172 R
[51] Int. Cl. ....................G01b 5/20, G01b 5/28, G01b 7/28
[58] Field of Search................33/178 A, 178 D, 179, 179 X, 33/174 R; 82/45

[56] References Cited

UNITED STATES PATENTS

| | | | |
|---|---|---|---|
| 2,468,875 | 5/1949 | Henriksen | 33/174 |
| 2,681,510 | 6/1954 | Willinger | 33/179 UX |
| 3,274,693 | 9/1966 | Witzke | 33/178 D X |

Primary Examiner—Leonard Forman
Assistant Examiner—Paul G. Foldes
Attorney—William F. Thornton and Plante, Hartz, Smith and Thompson

[57] ABSTRACT

A gage for measuring the out-of-roundness of cylindrical or spherical objects, which can perform such measuring while the objects are still mounted in the machine used in shaping them. A gage frame holds a flexible, nonstretchable sling in an opened looped position and also holds a transducer adapted to sense radial variations of the surface of the object being measured. In operation the sling is looped around a large arc of the circumference of the object being measured, thereby supporting the frame a fixed distance from the object and serving as a reference member. Upon rotation of the object about its circular center the transducer senses radial variations in the object's surface while relative movement between the object's center and the sling due to lobing conditions of the object are virtually eliminated. Also disclosed is a more accurate roundness measuring apparatus using two such gages in tandem.

24 Claims, 9 Drawing Figures

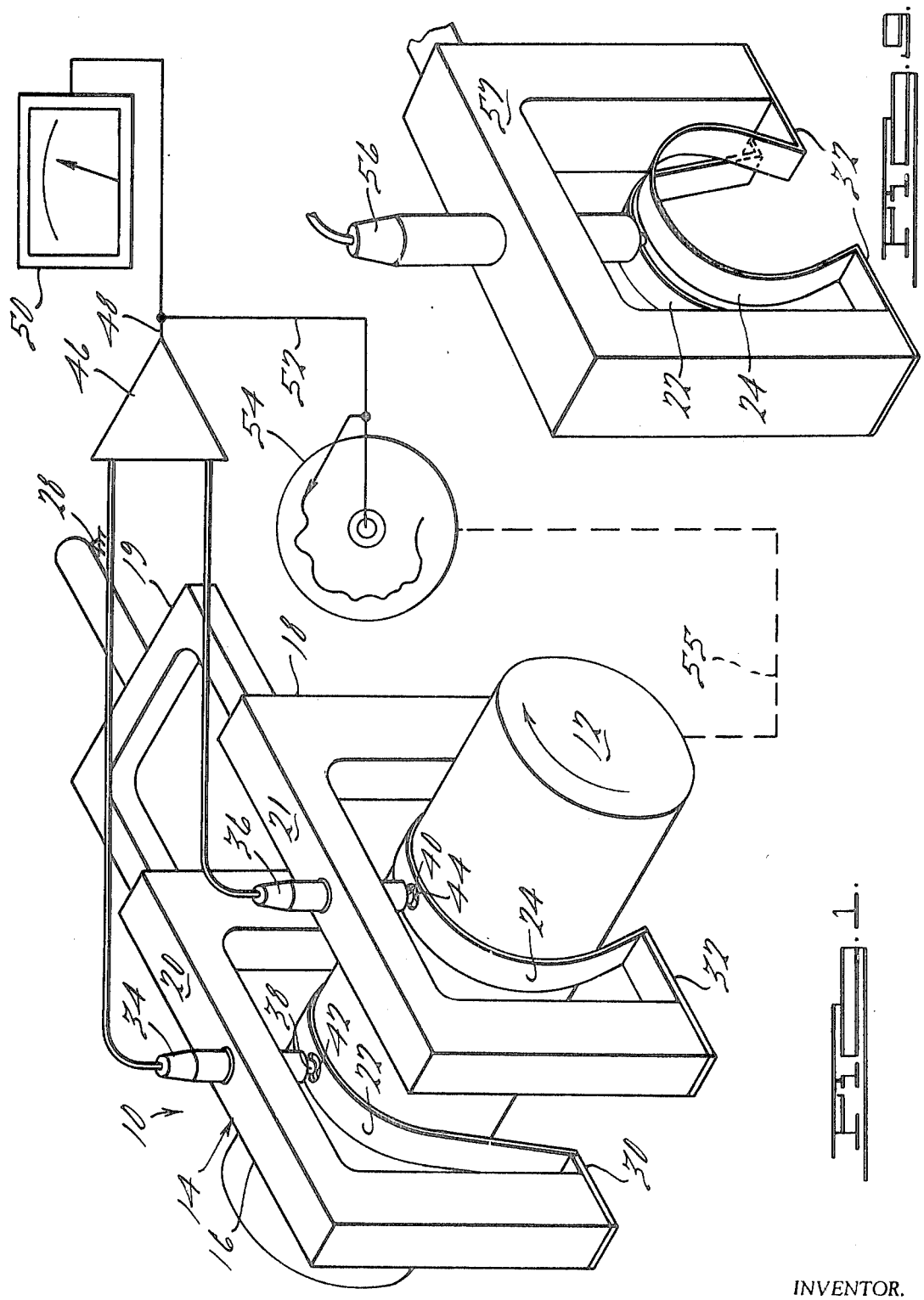

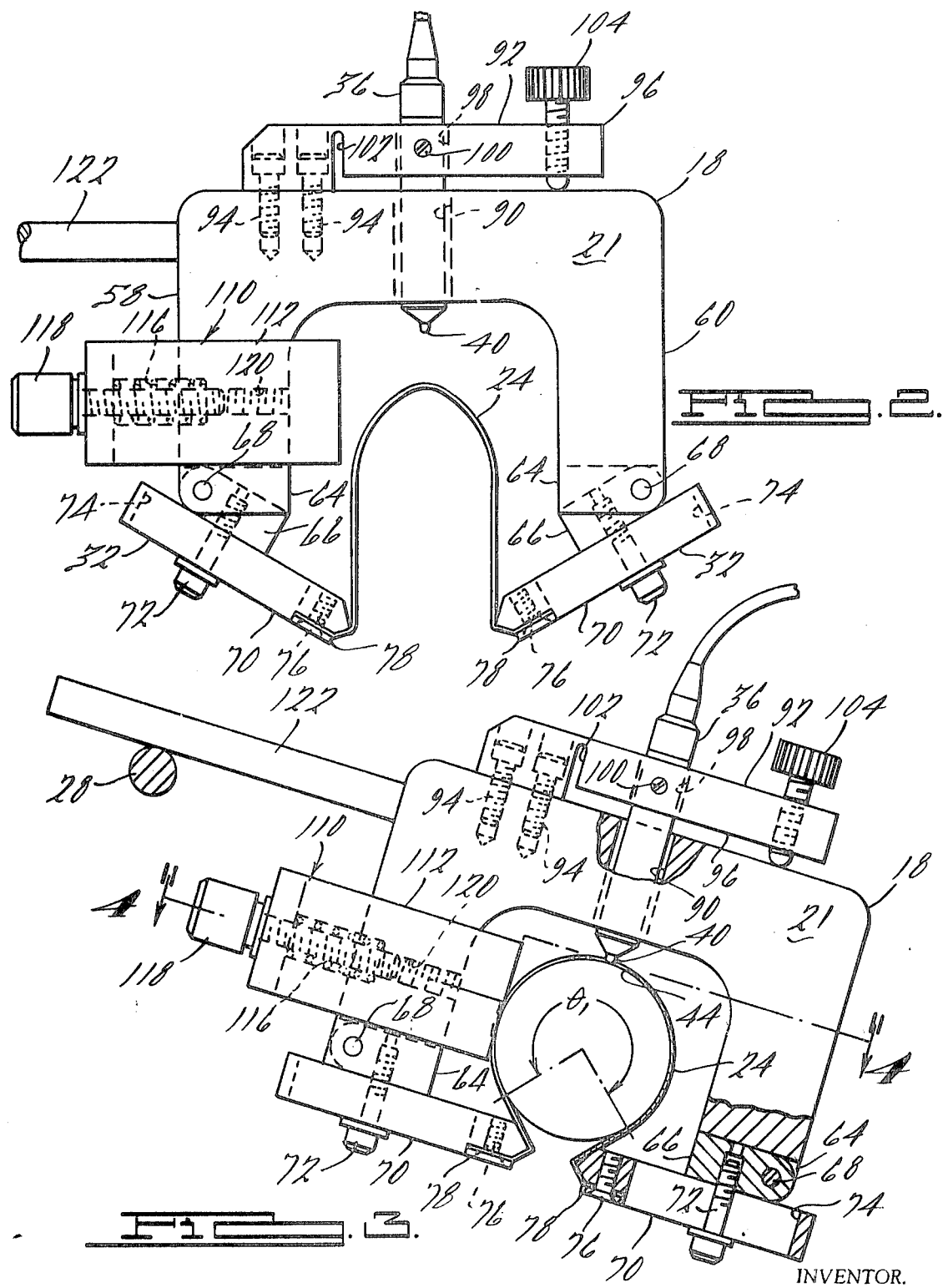

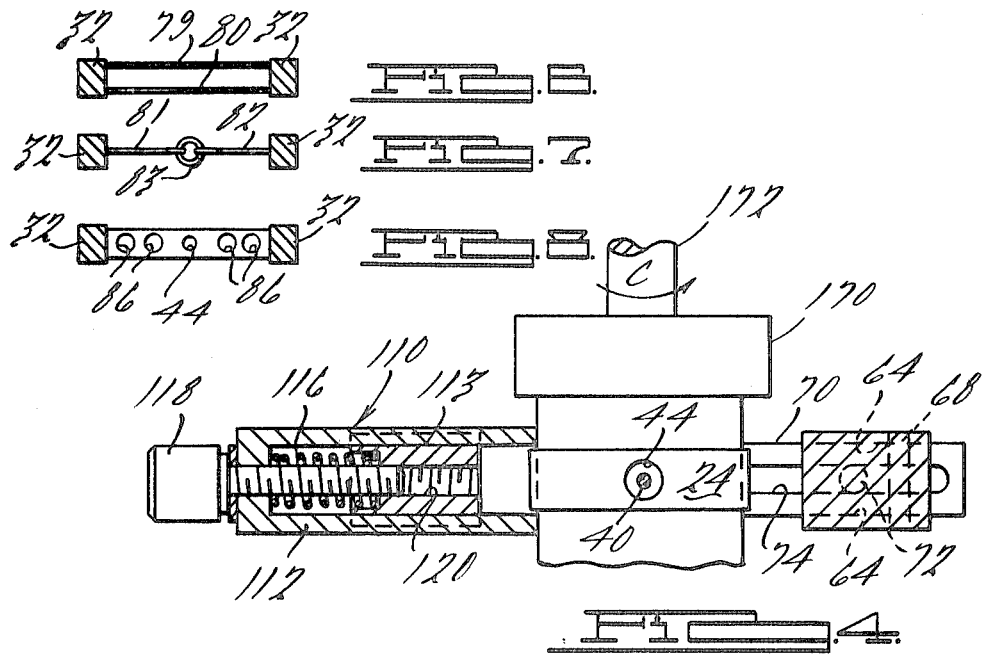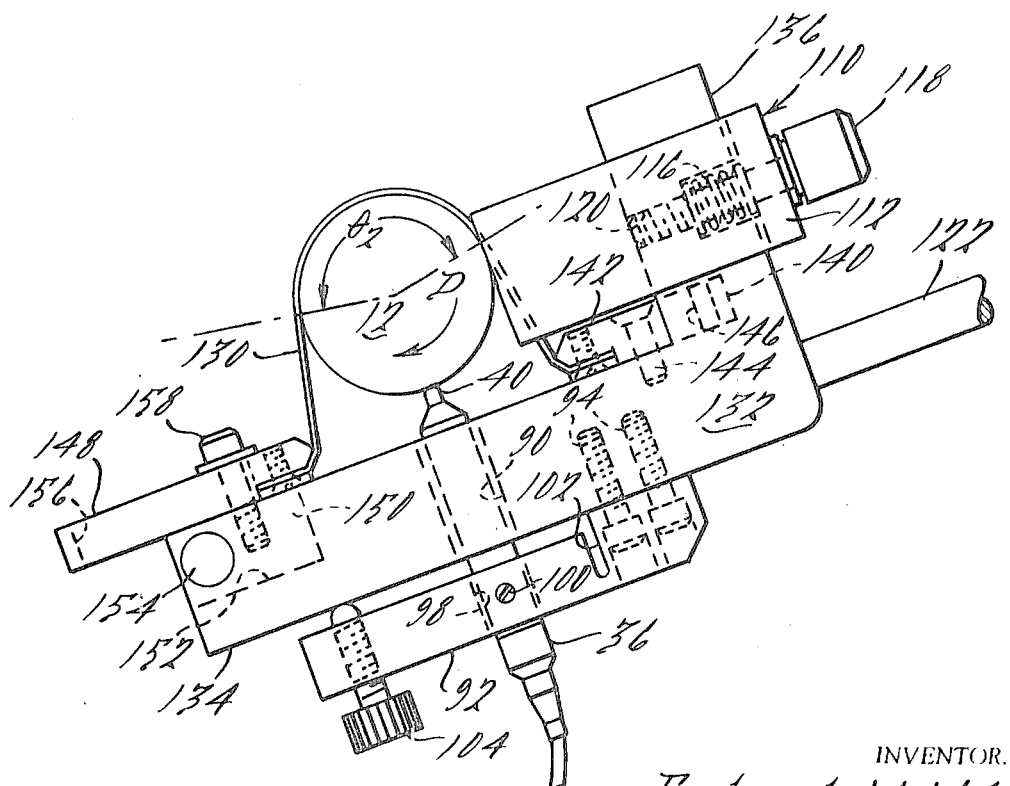

SLING ROUNDNESS GAGE

BACKGROUND OF THE INVENTION

1. Field of the Invention

This invention pertains to the art of measuring the radial variations, or out-of-roundness, of the surface of objects having nominally circular cross sections.

2. Description of the Prior Art

A commonly used and generally satisfactory apparatus for roundness measurement is that shown in U.S. Pat. No. 3,274,693 issued to me Sept. 27, 1966. It essentially measures the displacement of all points around the periphery of an object from two or more V-blocks or equivalent supporting devices and combines these measurements to determine with a high degree of accuracy the radial variations of the circular surface of a nominally cylindrical object from a true circle regardless of the type and number of lobes on its periphery.

A still more accurate measurement of out-of-roundness of a nominally round object may be obtained by comparing the circular surface of the object to that of a precision spindle axis. This method of determining out-of-roundness is regarded today as the most accurate method available.

A major difference in the accuracy between the device disclosed in my aforesaid patent and such precision spindle axis type measuring devices lies in the inability of the patented device to sense and measure very accurately objects having certain numbers of lobes, e.g., 11, 12, 13, 14, 24, 25, and 26, when using 60° and 120° angle V-blocks.

The present invention eliminates the lobing conditions which are not sensed and measured and also reduces to a minimum the error in the less accurately measured lobing conditions.

SUMMARY OF THE INVENTION

In accordance with my invention, a large arc of the circumference of the circular object whose roundness is to be measured is used as a reference surface from which to measure by means of a transducer the surface radial variations of the object. With my invention this is accomplished by wrapping a large arc of the circumference of the object whose roundness is to be tested with a flexible sling, such as a nonstretchable, woven tape. The sling is connected to a frame so that the sling forms a loop for receiving and bearing on the object, thus holding the frame in a fixed relationship to the object.

I have found that the length of the arc subtending the lobes, or points of longest radii, of a substantial portion of the circumference of a nominally circular cross-sectioned object will be substantially constant regardless of orientation of the arc around the circumference. Hence, any surface, such as that provided by the flexible, nonstretchable sling of the present invention, capable of conforming to or encompassing such lobes in a surface subtending arc of a circular object will maintain the center of the object substantially stationary with respect to the reference surface as the object is rotated. Thus, the true radial surface variations, or out-of-roundness, of the object at the point of measurement by a probe or transducer can be measured without introducing errors due to oscillation of the object's center with respect to the reference surface, a condition impossible of achievement by the prior art with the exception of the precision spindle gages. When, for instance with the device of my U.S. Pat. No. 3,274,693, V-blocks are used to establish two reference points on the surface of the object being measured, these points constantly change as the object is rotated during measurement and since the object's surface is not a true circle these points will not always be the same distance apart. Hence, the object's center will oscillate, out and in, in the V-blocks and such movement will be inaccurately sensed by the transducer as surface radial variations at the point of inspection.

Furthermore, I have discovered that by measuring the radial variations of the periphery of an object at longitudinally spaced points with two or more gages of my present invention, using slings which contact different sizes arcs, and combining said measurements, that I am able to determine with still a greater degree of accuracy the radial surface variations of an object. Indeed, such multiple sling gages using only one transducer reduce the maximum possible error to + or − 10 percent of the true values, and for most lobing conditions the error is much less, whereby I have created a gage comparable in accuracy to the precision spindle measurement devices. Furthermore, whereas with the gage of my aforesaid patent errors under certain lobing conditions were of a magnitude of 300 percent and more, with the gage of the present invention even with only a single sling errors for three-lobe objects are in the neighborhood of +29 percent, errors for two-lobe objects are around −17 percent and errors for all other lobing conditions have been found to be less than + or − 12 percent.

BRIEF DESCRIPTION OF THE DRAWINGS

FIG. 1 is a schematic view of the preferred embodiment of the roundness measuring apparatus of the present invention, showing one form of the sling of the present invention.

FIG. 2 is an elevational view of one of the gages of the apparatus shown in FIG. 1.

FIG. 3 is an elevational view of the gage of FIG. 2, with certain parts being broken away and in cross section, showing the gage in position on a part whose roundness is to be measured.

FIG. 4 is a cross-sectional view taken along the plane of the line 4—4 shown in FIG. 3.

FIG. 5 is an elevational view similar to FIG. 3 showing yet another preferred embodiment of the present invention in position on a part to be engaged.

FIGS. 6, 7 and 8 are elevational views of modifications of the sling shown in FIG. 1.

FIG. 9 is a view similar to FIG. 1 of still another preferred embodiment of the present invention.

DESCRIPTION OF THE PREFERRED EMBODIMENT

The present roundness measuring invention is here shown and described as embodied in apparatus for measuring the roundness of nominally cylindrical objects mounted on the machine which forms and shapes the roundness of the object. However, it should be understood that the present invention may be readily adapted to gage balls or for use in gaging devices which mount objects to be measured for roundness on opposed centers provided for that purpose or by any other means of rotating the object relative to the sling or vice versa, and that the present embodiments are intended to be exemplary only.

The apparatus 10 (FIG. 1) for measuring the out-of-roundness of a cylindrical part or object 12 comprises a supporting structure 14 having identical gages 16 and 18 held in fixed spaced relationship to each other by handle 19. The gages 16 and 18 comprise frames 20 and 21 having flexible, nonstretchable slings 22 and 24 respectively, fastened thereon in such a manner that the slings assume a open loop configuration. The looped slings 22 and 24 are adapted to rest on large arcs of the circular periphery of the object 12 to be measured, thus partially supporting the apparatus 10 a fixed distance from the part 12. The handle or partial support means 19 is attached to the frames 20 and 21 and is adapted to bear against a fixed rest 28, so positioned that the structure 14 will be held at a slight upward angle to the horizontal during the measurement operation. Of course the slings 22 and 24 may be held in contact with the object 12 by hand contact with the support structure 14, in which case the handle 19 can be held by hand to assist in steadying the gage during the measurement process. The slings 22 and 24 are fastened to their respective frames 20 and 21 by pairs of mounting means 30 and 32 (only one of each pair being shown). These mounting means 30 and 32 can be adjusted, in a manner to be hereinafter described, to cause each sling 22 and 24 to wrap a different size arc of the circumference of the object 12. In the embodiment shown in FIG. 1 sling 22 wraps an arc of 145°, whereas sling 24 wraps 240° of the object's circumference.

I have found that by using two such adjusted gages and summing properly their indications, the errors in measuring all types and numbers of lobing can be reduced to a minimum. Transducers 34 and 36, respectively, are fastened to the frames 20 and 21 and their probes 38 and 40, respectively, bear against the peripheral surface of the subject 12 through windows 42 and 44 in the slings 22 and 24. These windows are not necessary to operation of the gages, but are preferred, as the probes can follow the surface variations of the object 12 through the flexible slings. The transducers 34 and 36 may be of any suitable type, but particularly useful are transducers of the type shown in U.S. Pat. Nos. 2,545,881 and 2,844,879 assigned to the assignee of the present invention which produce an electric signal output the amplitude of which is a function of the displacement of the probe tip. The transducers 34 and 36 are connected to an amplifier-summer 46 which is suitably arranged, in a manner well known in the art, to form a transducer means that will provide an output indicative of the actual radial variations of the surface of the object 12 as it is rotated while in contact with the slings 22 and 24 and the transducers 34 and 36. Of course indications of such radial variations can also be obtained by keeping the object 12 stationary and rotating the apparatus 10 about the object while maintaining the apparatus in the same transverse plane. The output from the amplifier-summer 46 may be connected by conductor 48 to a meter or other suitable visual indicating means 50 and may also be connected by a conductor 52 to a polar chart recording device 54 which is driven in synchronism with the object 12 by any convenient means well known in the art represented at 55.

I have also found that one transducer 56 (FIG. 9) mounted on a unitary frame 57 and positioned half way between the slings 22 and 24 may be substituted for the transducers 34 and 36 and the summer section of the amplifier-summer 46. With the transducer 56 in a position midway between the slings 22 and 24, it will automatically give a summed and averaged reading with respect to said slings which can be fed directly to an amplifier (not shown) whose output can be connected to the meter 50 (FIG. 1) and the chart recorder 54 over lines 48 and 52 as aforesaid. Such an arrangement not only reduces the number of transducers needed and also eliminates the need for a summing and averaging network, but is as accurate as any previously known roundness measuring device.

Now referring to FIG. 2 the details of the measuring gages 16 and 18 will now be described by reference to gage 18. Frame 21 is generally U-shaped and the legs 58 and 60 thereof are each bifurcated at their free ends to form mounting tabs 64 (FIG. 4) for pivotally supporting the sling mounting means 32.

Each of the sling mounting means 32 comprises a hinge block 66 (FIG. 3) which is pivotally mounted between the bifurcations 64 by pin 68. Sling adjustment blocks 70 are slideably mounted on the blocks 66 by means of a screw 72 and an elongated longitudinal slot 74. The flexible sling 24 is fastened to the free ends of the adjusting blocks 70 so as to assume a loop-shaped configuration by means of screws 76 and mounting plates 78. The sling 24 can be constructed of any flexible, nonstretchable material such as metal, or woven tape fabricated of glass fiber, or nylon or metal filament thread. The sling is preferably coated with a low-friction material to reduce grabbing of the object 12 by the sling during measurement. Alternatively, a single strand, or parallel strands 79 and 80 (FIG. 6) of thread may be used for the sling. Yet another possible construction for the sling is single strands 81 and 82 (FIG. 7) of thread or filament attached to the sling mounting means 32 with their inner ends connected to a flexible ring member 83 which provides a window, such as the window or aperture 44 provided in the sling 24, at the sling midpoint. To cause the tape form of the sling 24 when wrapped about the object 12 to flatly conform to the periphery of the object 12 a series of holes 86 (FIG. 8) can be provided along the longitudinal dimension of the sling to maintain the outer edges of the sling taut against the object 12 during measuring.

The U-shaped frame 21 (FIG. 3) adjustably mounts the transducer 36 in a hole 90 provided in its bight so that the probe 40 extends beyond the frame 21 toward the sling 24. This mounting of the transducer 36 is accomplished by means of an L-shaped cantilever bar 92 fastened at one end to the frame 21 by screws 94 and having a cantilever leg 96 extending parallel to the bight of the frame 21. The transducer 36 passes through a hole 98 in the leg 96 and a set screw 100 makes possible large adjustments of the transducer 36 longitudinally within the holes 90 and 98, so that it may be fixed to the frame 21 so as to place the probe 40 in any desired position. Fine positioning of the probe 40 is achieved by a relief notch 102 cut in the leg 96 and a fine adjustment screw 104 provided near the free end of the leg 96. The resiliency of the material of which the bar 92 is constructed makes it possible upon turning the screw 104 to quite accurately position the probe 40 against the object 12.

A gage guiding and positioning means 110 (FIGS. 3 and 4) in the form of a bifurcated slide 112 is mounted on a reduced portion 113 of the leg 58 of the U-shaped frame 21. The slide 112 is mounted for adjustment toward and away from the sling 24 and the object 12 to be measured by means of a spring 116 and adjusting screw 118 threaded into a complimentary threaded hole 120 in the frame 21. On the same side of the frame 21 as the guiding means 110 a support arm 122 extends outwardly therefrom to assist in maintaining the gage in proper position during the measuring process when only one gage 18 is used for measuring.

In the embodiment shown in FIG. 5 parts identical to those previously described are given identical numbers and a modified gage is disclosed in which the transducer 36 contacts the object 12 being measured in the area between the ends of an unapertured sling 130 rather than through a window 44, as in the instance of the embodiment of the FIGS. 1–4. In this embodiment a gage frame 132 is L-shaped having a long leg 134 and a shorter leg 136 which mounts the guide means 110 in the same manner previously described and shown in FIG. 4. This short leg 136 however is provided with a passage 140 into which a sling support block 142 can be slid and fastened in any desired position by a screw 144 and a longitudinal slot 146 provided in the block 142. A similar block 148 is adjustably secured to a mounting block 150 which fits snugly in a notch 152 formed in the free end of the frame leg 134. The block 150 is removably but firmly held in the notch 152 for quick removal therefrom by a pin 154 which passes through openings (not shown) in the leg 134 and block 150. The adjusting block 148 is secured to the block 150 for sliding adjustment toward and away from the transducer 36 by means of a slot 156 and a screw 158. Thus it can be seen that to wrap the sling 130 about the object 12 to measure its roundness, the sling 130 can either be brought to position on the part by carrying it over a free end thereof, should the part be so mounted, or the pin 154 can be withdrawn permitting the block 150 and adjusting block 156 to drop away from the leg 134 permitting the sling 130 to be wrapped around the object 12 and the block 150 returned to the notch 152 and secured therein by pin 154.

In operation with the object to be measured 12 still mounted in the machine used to form the part, such as a lathe, the apparatus 10 of the present invention will accurately measure the radial variations of the object 12. The operation and function of the gages 16 and 18 are identical. Indeed a gaging apparatus more accurate than any roundness measuring device known, except the precision spindle gage, can be provided by merely using either of the gages 16 or 18 along without using them in tandem as disclosed in FIG. 1. Hence, in the immediately following description it will be assumed that only one of the gages, namely 18, is being used in the measuring process.

The object 12 can be rotated by reason of its being held in the chuck 170 (FIG. 4) of a machine tool or any device capable of holding and rotating the object. The chuck 170 is caused to rotate in the direction of the arrow C by the actuating mechanism 172 of the machine tool, only a part of which is shown. In view of the pivotal support of the sling mounting means 32, when not in operation they will assume a position similar to that shown in FIG. 2, due to the force of gravity thereon, thereby providing an enlarged opening between the ends of the sling 24 to pass the part to be measured. The gage 18 can then be brought down over the circular periphery of the object 12 so that it is straddled by the legs of the U-shaped frame 21 and the sling 24 is wrapped about the object, the weight of the gage causing the sling 24 to be tautly held against the object's circumference and the mounting means 32 to assume the position shown in FIG. 3. The gage 18 may be held in this position by hand, in which case additional pressure to keep the sling 24 taut can be applied although it is not necessary, or the handle 122 can be placed on the rest 28 so that the gage 18 is held at an angle to the horizontal as shown in FIG. 3 and the weight of the gage will keep the sling 24 taut. The arc of the circumference of the object 12 encompassed by the sling 24 can then be adjusted between wide limits by sliding adjustment of the blocks 70. In practice I have found that a degree of wrap in the neighborhood of 200° as shown by the angle $\theta_1$, provides optimum gage accuracy with a single gage of the construction shown in FIG. 3. A 160° wrap as shown by the angle $\theta_2$ I have found optimum with a single gage of the construction shown in FIG. 5.

Following the above-described adjustments the guide 110 is adjusted to place the transducer 36 in alignment with the center of the object 12 and to assist in maintaining the sling 24 and transducer 36 in a constant position relative to the part 12. Unless the sling 24 is constrained from sidewise movement accuracy will be reduced. In this case the force of gravity causes the guide 110 to straddle the sling 24 thus holding the object 12, sling 24 and the probe 40 in proper relationship. Other forces such as spring tension and magnetism could of course be employed to achieve this positioning. A final adjustment is then made by loosening the set screw 100 and bringing the probe 40 into contact with the surface of the object 12 and tightening the screw 100. Fine adjustments to accommodate the instrumentation may then be made using the adjustment screw 104.

Such adjustments having been made the measurement operation can then be quickly performed by rotating part 12 in the direction of the arrow C whereupon the probe 40 will follow the surface configuration of the part 12 and its movement can be indicated by a meter, such as meter 50 of FIG. 1, or recorded on a polar chart recorder, such as recorder 54. As previously mentioned, the sling 24 will provide a reference surface which, because it contacts a constant length of the circumference of the object 12 as it is rotated, regardless of which segment of the object's circumference contacts the sling, will maintain the object's center in substantially the same place relative to the probe 40 during rotation of the object 12. Hence, the only motion sensed by the probe 40 will be that due to surface radial variations of the object and highly accurate roundness readings can be achieved.

In operation the preferred embodiment shown in FIG. 5 is mounted on the part 12 to be measured in the manner hereinbefore described with the assistance of the quick connect pin 154. However, as will be seen in FIG. 5 the L-shaped frame 132 is suspended from the object 12 by the sling 24. The handle 122 still contacts the rest 28 which however is now placed at the opposite side of the object 12 and maintains the frame 132 at a similar angle to that shown in FIG. 3 for the previously described embodiment so that the guide 110 bears against the object 12 positioning the probe 40 accurately with respect to the center of the object 12. Through adjustment of the blocks 142 and 148 the subtended arc of the surface of the object 12 can be adjusted to the desired angle $\theta_2$, which when one gage frame 132 is being used is 160°. As will readily be seen adjustment of the guide means 110 and the transducer 136 are performed in the same manner as was described for the embodiment disclosed in FIGS. 2–4. After these adjustments the part 12 is rotated in the direction of the arrow D and the measurements of radial surface variations are taken in the manner previously described.

As previously mentioned, the gaging apparatus 10 (FIG. 1) will ideally use two or more slings 22 and 24 with their respective degrees of sling wrap around the object 12 being 145° and 240°, respectively, when two slings are provided. When the slings 22 and 24 are so adjusted and in operation the output of the single transducer 56 or transducers 34 and 36 is processed as aforesaid, the resulting signal provides a very accurate indication to the meter 50 or polar charting device 54 of radial variations of the object 12, despite the presence of a great number of lobing conditions which previously caused errors in the output of prior art devices.

Although not shown, it should be understood that the sling 24 may be so constructed that it wraps the object 12 a number of times. The essence of such applications to the object 12 is that for best operation the degree of wrap of the object should be multiples of 360° plus the indicated angles for the respective embodiments. Furthermore, while I have shown the transducers 34 and 36 aligned with the open portion of the looped sling 24 it should be understood that they may be placed at any arcuate position around the object to be measured, so long as their position relative to the sling does not change during operation. While I have described a number of preferred embodiments of the present invention, it will be obvious that many changes, adaptations, and modifications may be made therein without departing from the spirit and scope of the appended claims.

I claim:

1. A roundness gage for measuring the radial variations of the surface of an object having nominally circular cross section during relative rotation between the gage and the object comprising:

a transducer adapted to sense the radial location of the surface to be measured;

sling mounting means fixedly arranged during measuring with respect to said transducer, said mounting means also being arranged to be out of contact with the object during measuring;

means mounting said sling mounting means on said transducer; and nonstretchable and flexible sling means held by said sling mounting means for contact during measurement with an arcuate portion of the surface to be measured for roundness to maintain the object's center a substantially fixed distance from said transducer during relative rotational movement between the object and said transducer.

2. The roundness gage of claim 1 wherein said sling mounting means holds said sling means looped and said means mounting said sling mounting means holds said transducer so as to sense radial variations in the arcuate surface portion of the object encompassed by said sling means.

3. The roundness gage of claim 1 wherein the means mounting said sling mounting means holds the transducer so as to sense radial variations in the surface of the object to be measured in the plane of the sling and in an arc of the surface being measured not encompassed by said sling.

4. The roundness gage of claim 1 wherein said sling means comprises at least two, spaced, parallel, strands of equal length.

5. The roundness gage of claim 1 wherein said sling means comprises two, nonstretchable, flexible strands connected by a flexible, nonstretchable ring member.

6. The roundness gage of claim 1 wherein said band of material is provided with an aperture through which said transducer senses the radial location of the surface of the object.

7. The roundness gage of claim 1 wherein said band comprises a woven tape.

8. The roundness gage of claim 1 wherein said band is provided with a plurality of longitudinally spaced apertures.

9. The roundness gage of claim 1 wherein said means mounting said sling mounting means on said transducer includes means for adjustably moving said transducer toward and away from said sling.

10. The roundness gage of claim 1 wherein said sling mounting means is adjustable to vary the amount of the arcuate surface of the object contacted by said sling means and to prevent contact of said mounting means with the object during measuring.

11. The roundness gage of claim 10 wherein said sling mounting means comprises a pair of spaced sling holding blocks mounted for sliding adjustment to change the space between said blocks.

12. The roundness gage of claim 1 wherein said sling mounting means holds said sling means looped, and said sling mounting means is adapted to permit opening of the loop when said sling is not in taut contact with the object.

13. The roundness gage of claim 12 wherein said sling mounting means are pivotally mounted on said sling mounting means.

14. The roundness gage of claim 1 including guiding means on said means mounting said sling mounting means for maintaining a predetermined relationship between the object being measured and said transducer.

15. The roundness gage of claim 14 wherein said guiding means contacts the object being measured on opposite sides of said sling.

16. The roundness gage of claim 16 including means on said sling mounting means mounting means for partially supporting same on a rest.

17. The roundness gage of claim 1 wherein said sling mounting means comprises two separate sling holding means for holding said sling means looped, one of said sling holding means being releasable from said sling mounting means.

18. The roundness gage of claim 1 wherein the sling means is adapted to wrap substantially 200° of the object.

19. The roundness gage of claim 1 wherein said sling mounting means is suspended from the object and the sling means is adapted to contact substantially 160° of the circumference of the object.

20. Apparatus for measuring the radial variations of the surface of an object having a nominally circular cross section comprising:
a frame;
a plurality of flexible nonstretchable slings on said frame arranged to tautly contact different portions of the surface of the object to be measured; and
transducer means arranged in a fixed relationship with said flexible slings during measurement for generating a signal indicating the radial variation of the surface of the object with respect to said slings upon relative rotation between the object and said slings.

21. The apparatus of claim 20 wherein at least two of said sling members are arranged on said frame to encompass different predetermined arcs of the circumference of the object.

22. The apparatus of claim 20 wherein said slings are arranged to contact the object being measured at points spaced along the length of the object.

23. The apparatus of claim 20 wherein there are two of said slings one of which contacts substantially a 145° arc of the circumference of the part and the other of which contacts substantially a 240° arc of the circumference of the object.

24. The apparatus of claim 20 wherein said transducer means is arranged to measure the radial variation of the surface of the object midway between two slings.

* * * * *